(12) United States Patent
Nagai et al.

(10) Patent No.: US 7,508,809 B2
(45) Date of Patent: Mar. 24, 2009

(54) BASE STATION AND RADIO TERMINAL

(75) Inventors: Yukimasa Nagai, Tokyo (JP); Hiroyoshi Suga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 10/551,701

(22) PCT Filed: May 14, 2004

(86) PCT No.: PCT/JP2004/006871

§ 371 (c)(1),
(2), (4) Date: Sep. 30, 2005

(87) PCT Pub. No.: WO2004/102889

PCT Pub. Date: Nov. 25, 2004

(65) Prior Publication Data

US 2006/0189352 A1 Aug. 24, 2006

(30) Foreign Application Priority Data

May 16, 2003 (JP) ............................. 2003-139438

(51) Int. Cl.
*H04J 3/00* (2006.01)
*H04B 7/212* (2006.01)
(52) U.S. Cl. ..................................... 370/345; 370/347
(58) Field of Classification Search ................. 370/310, 370/328, 329, 334–337, 346, 345, 347; 375/299, 375/347; 455/39, 73, 101, 561, 562.1
See application file for complete search history.

(56) References Cited

U.S. PATENT DOCUMENTS 5,164,938 A * 11/1992 Jurkevich et al. ............ 370/231
5,692,130 A * 11/1997 Shobu et al. ................ 709/229
6,094,439 A * 7/2000 Krishna et al. .............. 370/445
7,194,237 B2 * 3/2007 Sugar et al. .................. 455/39
7,200,178 B2 * 4/2007 Shoemake et al. .......... 375/260
7,206,586 B2 * 4/2007 Kim et al. .................... 455/450
2002/0167920 A1 11/2002 Miyazakie
2004/0008796 A1 * 1/2004 Andrews ..................... 375/267
2004/0013211 A1 * 1/2004 Lindskog et al. ............ 375/347
2004/0141502 A1 * 7/2004 Corson et al. ............... 370/389
2004/0156339 A1 * 8/2004 Urquhart et al. ............ 370/334
2004/0208145 A1 * 10/2004 Sim et al. .................... 370/335
2004/0223475 A1 * 11/2004 Hong .......................... 370/338
2007/0155393 A1 * 7/2007 Hirai et al. .................. 455/450

FOREIGN PATENT DOCUMENTS

| DE | 4130318 A1 | * | 3/1993 |
|---|---|---|---|
| JP | 5-35624 A | | 2/1993 |
| JP | 2000-151619 A | | 5/2000 |
| JP | 2000-299704 A | | 10/2000 |
| JP | 2000-299704 A | * | 11/2000 |
| JP | 2002-135304 A | | 5/2002 |
| JP | 2003-87855 A | | 3/2003 |

* cited by examiner

*Primary Examiner*—Lester Kincaid
*Assistant Examiner*—Nathan Mitchell
(74) *Attorney, Agent, or Firm*—Birch, Stewart, Kolasch & Birch, LLP

(57) ABSTRACT

A base station for a wireless LAN system has physical layers corresponding to channels, and a MAC layer. The physical layers each transmits and receives a radio signal conforming to an IEEE 802.11 standard using a corresponding channel. When transmitting, the MAC layer divides an entire data frame conforming to the standard from a head of the data frame, in accordance with a transmission rate of each physical layer, and allots the divided data frame to the physical layers so that burst times of the channels are substantially equal. When receiving, the MAC layer combines data frames received via channels through operations opposite to those performed when transmitting.

46 Claims, 12 Drawing Sheets

BASE STATION AND RADIO TERMINAL

TECHNICAL FIELD

The present invention relates to a base station and a radio terminal for transmitting and receiving a radio signal according to the IEEE 802.11 Wireless LAN Standards. More specifically, the present invention relates to a base station and a radio terminal for widening a band using a plurality of communication channels.

BACKGROUND ART

A conventional radio communication system (wireless LAN communication system) will be explained. At present, products according to the IEEE 802.11b standard, the IEEE 802.11a standard, and the like, which are standardized according to the American IEEE 802.11 Wireless LAN Standards (see Non-Patent Literature 1: IEEE 802.11 from http//standards.ieee.org/getieee802/802.11.html) have been marketed as apparatuses for constructing home/office high-speed wireless network systems.

A wireless LAN according to the IEEE 802.11b standard (see Non-Patent Literature 2: IEEE 802.11b) has a maximum physical transmission rate of 11 megabits per second, using a 2.4-gigahertz band and complementary code keying (CCK) as a modulation scheme. A wireless LAN according to the IEEE 802.11a standard (see Non-Patent Literature 3: IEEE 802.11a) has a maximum physical transmission rate of 54 megabits per second, using a 5-gigahertz band and orthogonal frequency division multiplex (OFDM) as a modulation scheme. A wireless LAN according to the IEEE 802.11g standard, for which specifications of the standard are being considered, has a maximum physical transmission rate of 54 megabits per second, using a 2.4-gigahertz band and the ODFM as a modulation scheme.

The conventional radio communication systems have, however, a problem in that an effective rate indicating at what rate a data stream can be actually transmitted is often equal to or lower than half the maximum physical transmission rate.

Specifically, a data stream to be transmitted, for example, is divided into a plurality of data packets. Each data packet is added with header information including information for transmission control including destination/sender IP addresses, a packet length, a packet number, and the like and with information for error correction control. The data packets added with the information are received by a lower layer as international protocol (IP) packets. In a media access control (MAC) layer, a data frame is also added with header information including information for transmission control including destination/sender MAC addresses, a frame length, and the like, as well as information for error correction control and the data frame may be encoded and added with decoding information to be received by a physical layer. In the physical layer, the data frame is added with header information including information for transmission control including a modulation scheme, a frame length, and the like, as well as a preamble for synchronization and the like to be transmitted.

Furthermore, the base station or each radio terminal performs carrier sensing for the radio channel before transmission of the radio frame. If the base station or radio terminal confirms that the channel is being used (the channel is busy), it refrains from transmitting the radio frame. After confirming that the channel is not being used (the channel is idle), the base station or radio terminal uses a random access scheme called carrier sense multiple access/collision avoidance (CSMA/CA) for transmitting the radio frame. A base station or a radio terminal designated by the MAC address returns an ACK/NACK frame indicating whether the radio data frame has been correctly received. If the radio data frame has not been correctly received, the frame is retransmitted.

Accordingly, the effective rate is not equal to the physical transmission rate for the wireless LAN according to the IEEE 802.11b, IEEE 802.11a, or IEEE 802.11g standard. Actually, therefore, the effective rate is equal to or less than approximately half the physical transmission rate, depending on the environmental conditions of the transmission system.

Namely, if the conventional home/office wireless network system (wireless LAN) according to the IEEE 802.11a standard, the IEEE 802.11b standard, the IEEE 802.11g standard, or the like is to perform bidirectional communications for a data stream of a video signal for a high resolution television HDTV (High Definition Television) that requires, for example, approximately 20 megabits per second, the effective rate is insufficiently low.

To solve the problem of the insufficient effective rate, there is proposed, for example, the following method disclosed in Japanese Patent Application Laid-Open No. 2002-135304. In this method, if a broadband data stream, for example, is to be transmitted and received, IP packets are allocated to a plurality of radio units operating with different channels to be transmitted and received under independent controls of the respective radio units. However, if the respective units use different modulation schemes or the allocated IP packets have different sizes, a delay is caused by processes such as rearrangement of packets, because the allocation to the radio units is carried out in IP packet units. Furthermore, the leakage power from an adjacent channel becomes higher than a carrier sense threshold because of the independent controls of the respective radio units. As a result, normal transmission cannot be carried out.

There is also proposed the following different method. In this different method, one radio unit serves as a master, and if a broad transmission band is necessary for video transmission or the like, a sub radio unit corresponding to a channel allocated in advance is operated as a slave. The master transmits and receives a control signal for a plurality of radio units to acquire a radio channel access right, whereby the radio units transmit and receive IP packets. This method has, however, the following problem similarly to the above method. When the radio units use different modulation schemes or the allocated IP packets have different sizes, because the allocation to the radio units is carried out in IP packet units, on one hand, reception cannot be performed even if a radio unit has completed transmission, if another radio unit has not completed transmission. On the other hand, a terminal receiving IP packets cannot perform transmission even if a radio unit has completed reception, if another radio unit has not completed reception. As a result, the radio band cannot be efficiently used.

The present invention has been achieved in view of the above problems. It is an object of the present invention to provide a radio communication system (a base station and a radio terminal) capable of improving the throughput by efficiently using the radio band.

DISCLOSURE OF INVENTION

A base station (or a radio terminal) according to the present invention, being an apparatus for a wireless LAN system realizing band-widening using a plurality of communication channels, includes: a plurality of physical layers corresponding to the plurality of communication channels, and each that transmits and receives a radio signal conforming to an IEEE 802.11 standard using a corresponding communication channel; and a media access control (MAC) layer. The MAC layer, when transmitting, divides an entire data frame conforming to the IEEE 802.11 standard from a head of the data frame, in accordance with a transmission rate of each physical layer, and allots the divided data frame to the physical layers so that burst times of the communications channels are substantially equal, and when receiving, combines data frames received via a plurality of communication channels through operations opposite to those performed when transmitting.

According to the present invention, for example, a radio signal according to the IEEE 802.11a standard, the IEEE 802.11b standard, the IEEE 802.11g standard, or the like is allotted to a plurality of communication channels to be transmitted to a home/office wireless network. A MAC layer sets the entire frame as a division target, and allots the frame divisions to the respective physical layers.

BEST MODE(S) FOR CARRYING OUT THE INVENTION

Exemplary embodiments of a radio communication system (base station and radio terminal) according to the present invention will be explained below in detail with reference to the accompanying drawings. The invention is not limited by the embodiments.

First Embodiment

Figure 1:
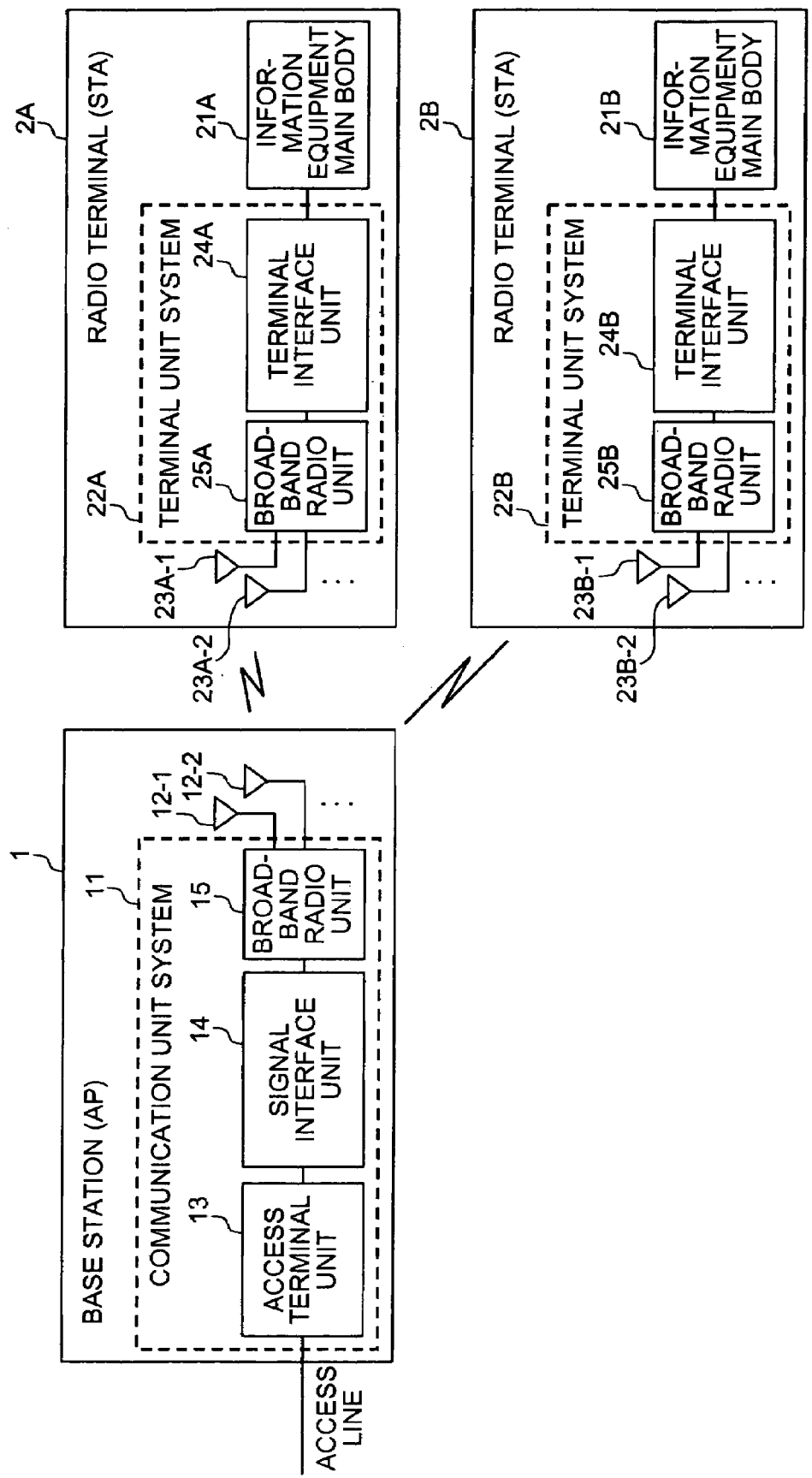
FIG. 1 is an illustration of a configuration of a radio communication system according to the present invention.

FIG. 1 is an illustration of a configuration of a radio communication system (radio network for home/office) according to the present invention. This radio communication system includes a base station (AP) 1 and a plurality of radio terminals (STA) 2A, 2B, . . . . The base station 1 has a gateway for mutual connection to an access line (for example, Ethernet®, xDSL, CATV, FTTH, or the like) connecting to an access network that constitutes a wired or wireless external communication network, The base station 1 includes a communication unit system 11 that terminates a wired or wireless access line connecting to an access network, and that transmits reception information from the access network to specific radio terminals 2A, 2B, . . . , through a wireless network in a home/office. This communication unit system 11 includes an access terminal unit 13 that terminates the access line, a signal interface unit 14 (corresponding to, for example, a router or a bridge) that controls a mutual conversion signal formats between a signal of the access network and signals of the radio terminals 2A, 2B, . . . , a broadband radio unit 15 that transmits and receives a radio signal according to the IEEE 802.11a standard, the IEEE 802.11b standard, the IEEE 802.11g standard, or the like to and from the wireless network in the home/office through a plurality of channels, and antennas 12-1, 12-2, . . . . While a plurality of antennas are connected to the broadband radio unit 15 in this embodiment, the number of antennas may be one.

The radio terminals 2A and 2B include information equipment main bodies 21A and 21B such as personal computers, PDAs, or television receivers, and terminal unit systems 22A and 22B controlling transmission and reception of data between the information equipment main bodies 21A and 21B and the communication unit system 11 of the base station 1, respectively. The terminal unit systems 22A and 22B include terminal interface units 24A and 24B controlling mutual conversion of signal formats between a signal from the base station 1 or the other radio terminal and a signal from the information equipment main bodies 21A and 21B, broadband radio units 25A and 25B that transmit and receive a radio signal according to the IEEE 802.11a standard, the IEEE 802.11b standard, the IEEE 802.11g standard, or the like to and from the home/office wireless network through a plurality of channels, and antennas 23A-1, 23A-2, . . . , and 23B-1, 23B-2, . . . , respectively. Although a plurality of antennas are connected to the respective broadband radio units 25A and 25B in this embodiment, the number of antennas connected to each broadband radio unit may be one. Furthermore, while the radio communication system in which the radio terminals are connected to the base station is described in this embodiment, the present invention is not limited to this embodiment. The present invention is also applicable to, for example, an ad hoc network in which radio terminals construct their independent network and carry out communications.

Figure 2:
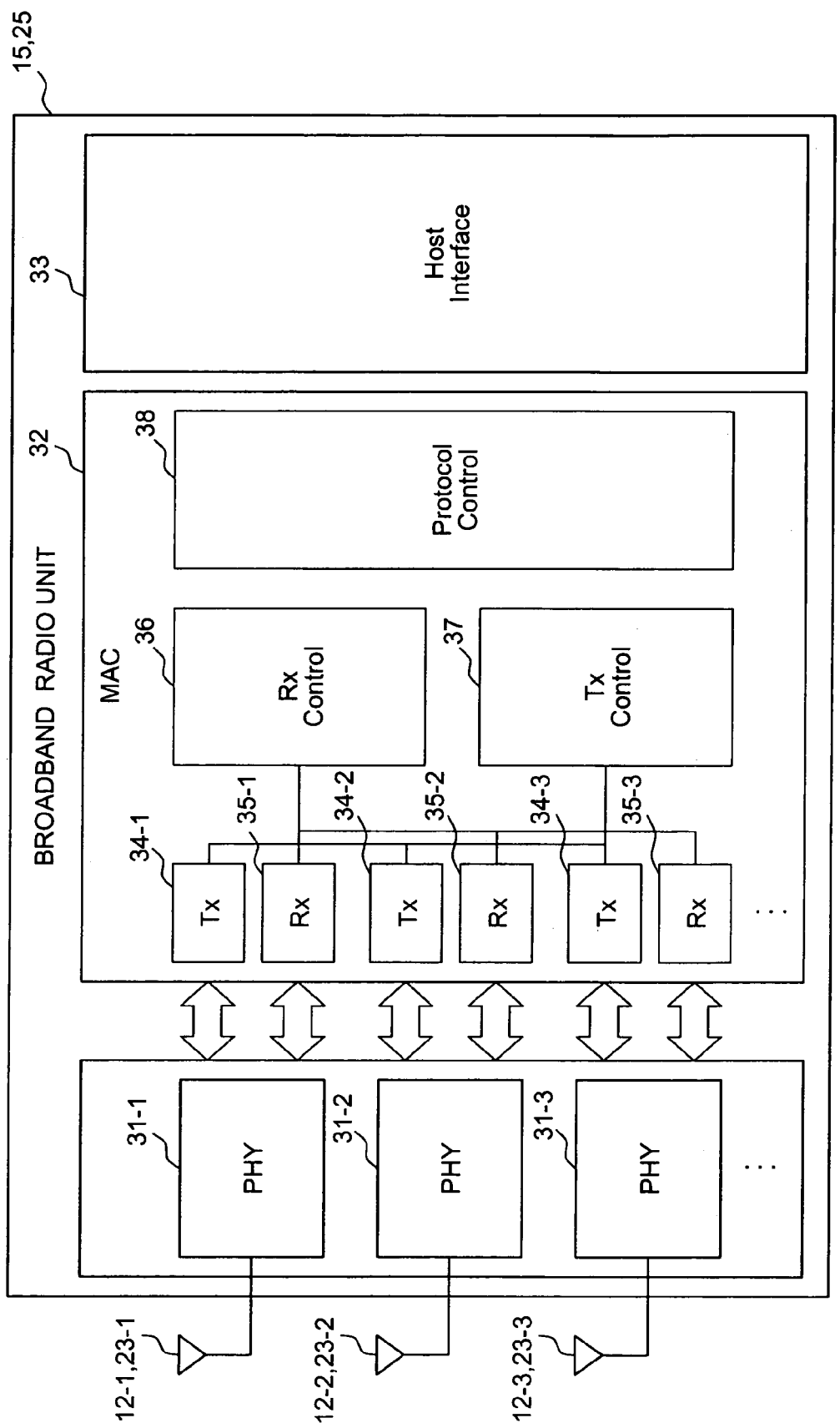
FIG. 2 is an illustration of a configuration of a broadband radio unit.

FIG. 2 is an illustration of a configuration of the broadband radio units 15 and 25 according to this embodiment. Each of the broadband radio units 15, 25A, and 25B (the units 25A and 25B correspond to the unit 25 shown in FIG. 2) includes a host interface unit (Host Interface) 33 for connecting the broadband radio unit 15, 25A or 25B to the signal interface unit 14 or the terminal interface unit 24A or 24B, a media access control (MAC) layer 32 according to the IEEE 802.11 standard (a, b, e, f, g, h, i, or the like) and expanded to satisfy this embodiment, and a plurality of physical layers (PHYs) 31 (corresponding to PHYs 31-1, 31-2, 31-3, . . . ) operating with a plurality of different channels conforming to the IEEE 802.11a standard, the IEEE 802.11b standard, IEEE 802.11g standard, or the like.

The MAC 32 corresponds to an expansion of the IEEE 802.11 standard (a, b, e, f, g, h, i, or the like). If the physical layers corresponding to the plurality of channels are not used, the MAC 32 operates according to the IEEE 802.11 standard. A TxControl unit 37 in the MAC 32, performs frame allotment for transmitting a transmission frame through a plurality of channels, frame check sequence (FCS) addition, time stamp addition, control of readout from a buffer, backoff processing, and automatic generation of at least one of an request to send (RTS) frame, a clear to send (CTS) frame, and an ACK frame. An RxControl unit 36 performs combining of frames received through the plurality of channels, FCS check, write process to a buffer, address decoding, and channel status processing.

The MAC 32 also includes a plurality of Transmission (Tx) units 34 (corresponding to Tx units 34-1, 34-2, 34-3, ...) and Reception (Rx) units 35 (corresponding to Rx units 35-1, 35-2, 35-3, ...). Each of the Tx units 34 and Rx units 35 performs issuance of a primitive to the corresponding physical layer, data write process, and data readout process.

Accordingly, the MAC 32 is configured so that the Tx units 34 and the Rx units 35 each performs the necessary processes on the individual frame, and the TxControl unit 37 and the RxControl unit 36 perform the necessary processes on all the frames.

A Protocol control unit 38 functions not only to control acquisition of an access right with respect to each channel based on a CSMA/CA protocol but also to determine a transmission rate of each channel, a frame allotment ratio between the channels, a transmission data amount in each channel, and the like.

The MAC 32 further includes a transmission and reception buffer, an encoding unit, an authentication management unit, and the like although not shown in FIG. 2. Each physical layer 31 includes an RF unit having a BaseBand unit that modulates a signal from the MAC 32 to a transmission signal and demodulates a reception signal to a signal to be transmitted to the MAC 32, an up-converter/down-converter converting the signal transmitted from/to to the BaseBand unit to a desired signal, a power amplifier, and the like.

Figure 3:
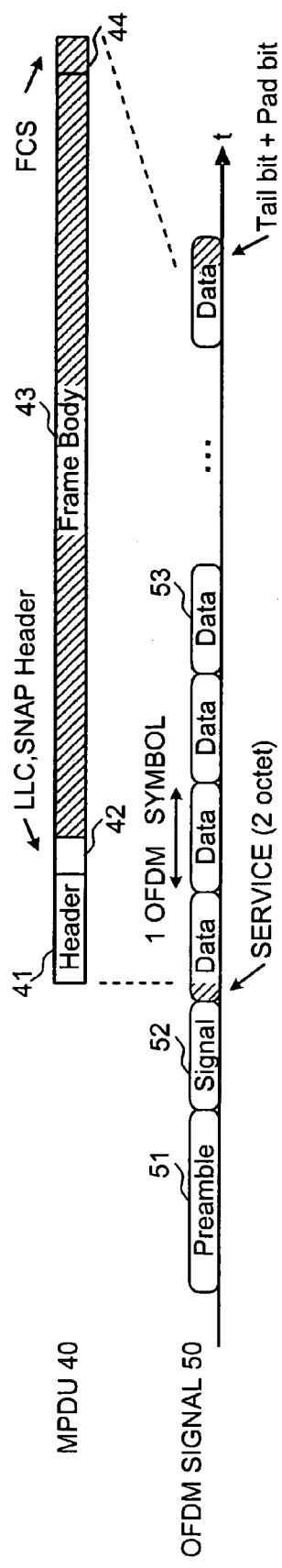
FIG. 3 is an illustration of a data frame format according to the IEEE 802.11a standard.
Figure 4:
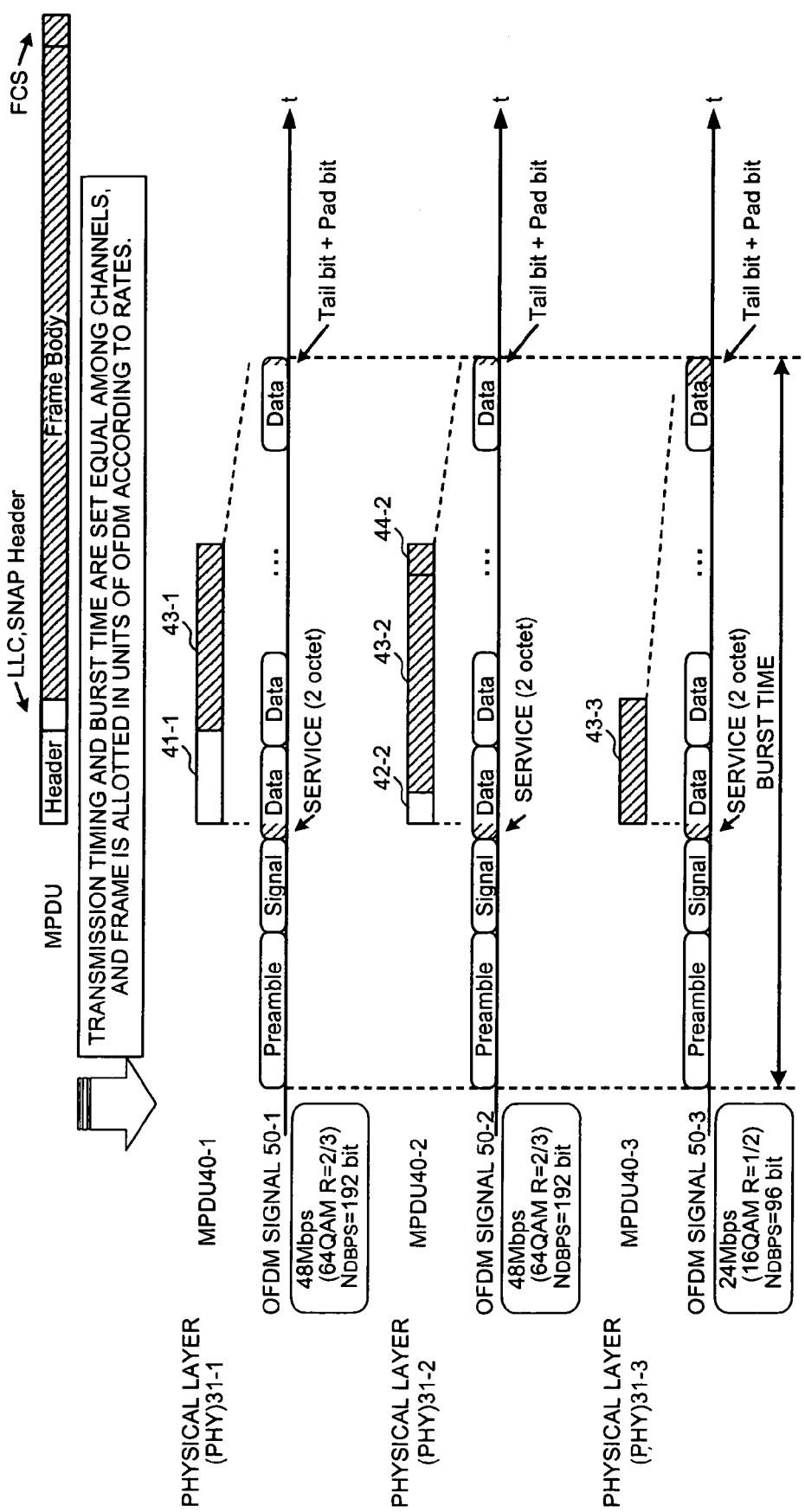
FIG. 4 is an illustration of a frame format when a plurality of channels are used.

Operations of the radio communication system will next be explained. FIG. 3 is an illustration of a data frame format according to the IEEE 802.11a standard and FIG. 4 is an illustration of a frame format when a plurality of channels (three channels) are used. FIGS. 3 and 4 indicate that if a frame is allotted to a plurality of channels to be transmitted, the burst times of the channels are equal. It is noted that data bits per OFDM symbol ($N_{DBPS}$) is specified in the IEEE 802.11a standard and indicates a number of data bits that can be transmitted per OFDM symbol. In this embodiment, for convenience of explanation only, a number of octets that can be transmitted per OFDM symbol is defined as data octets per OFDM symbol ($N_{DOPS}$). That is, $N_{DOPS}$ equals $N_{DBPS}/8$.

A data frame (MPDU) 40 according to the IEEE 802.11a standard shown in FIG. 3 includes an MAC header 41, an LLC header/SNAP header 42, a frame body 43, and an FCS 44. If the MPDU 40 is transmitted from the MAC 32 to the physical layers 31, an OFDM signal 50 is transmitted in the order of a preamble 51 for synchronization, a SIGNAL 52 including at least one of a transmission rate, a transmission data length, and the like, and DATA 53 including a SERVICE field and a transmitted part of the MPDU 40. A guard interval included between the OFDM symbols and changes in a bit arrangement order and in the number of bits due to modulation in the physical layers 31 are not shown.

FIG. 4 is an illustration of frame division statuses of the MPDU 40 among the plurality of channels, MPDUs 40-1, 40-2, and 40-3 in the respective channels after the division, and OFDM signals 50-1, 50-2, and 50-3 in the respective physical layers 31-1, 31-2, and 31-3.

Figure 5:
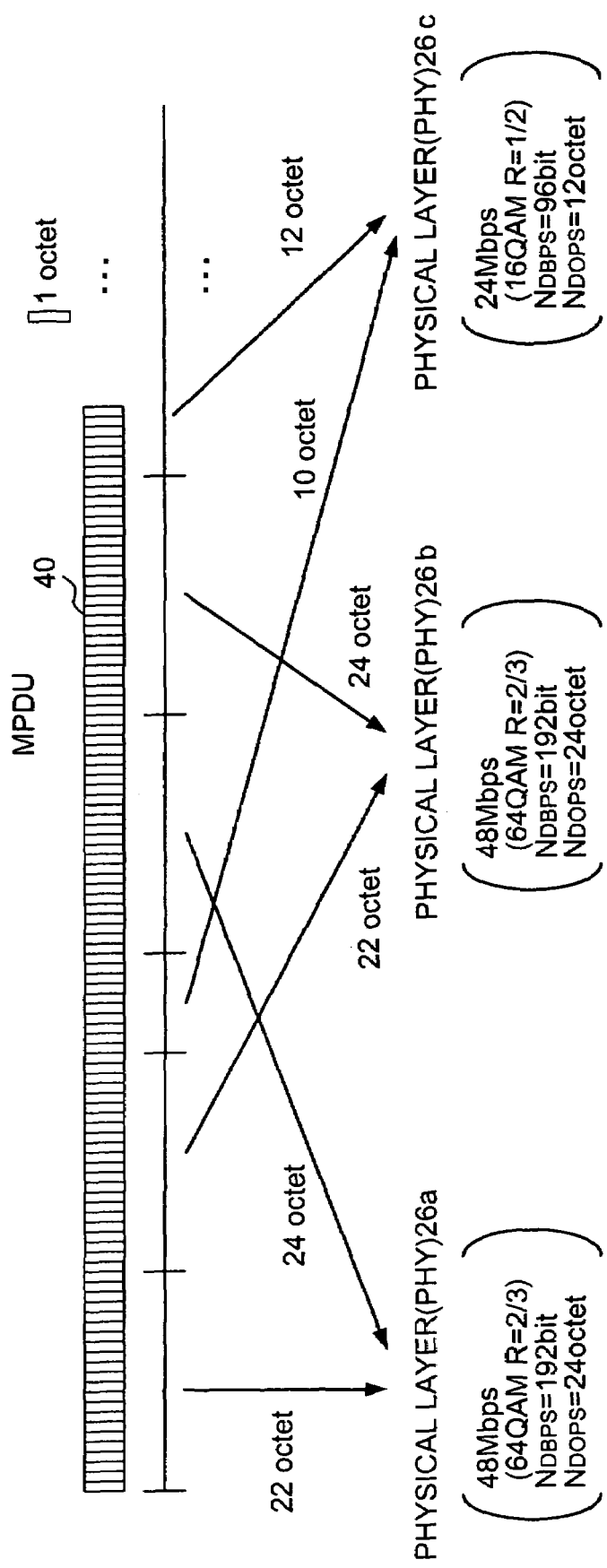
FIG. 5 is an illustration of a method for dividing/distributing MPDU.

In this embodiment, all of the MAC header 41, the LLC header/SNAP header 42, the Frame Body 43, and the FCS 44 specified by an IEEE 802.11 standard are a target of the division. As shown in FIG. 5, the MPDU 40 is divided from a head of the MPDU 40 in units of $N_{DOPS}$ according to transmission rates of the respective physical layers 31-1, 31-2, and 31-3 (divisions corresponding to an MAC header 41-1, an LLC header/SNAP header 42-2, frame bodies 43-1, 43-2, and 43-3, and an FCS 44-2 shown in FIG. 4) into divisions. Each physical layer receives a unit of data, which can be transmitted with one OFDM symbol. FIG. 5 is an illustration of a method for dividing/allotting the MPDU 40. In FIG. 4, therefore, the OFDM signals 50-1, 50-2, and 50-3 on the respective physical layers have burst times that are substantially equal.

Although not shown in the drawings, since the ACK frame includes only the MAC header and the FCS, the ACK frame is transmitted through each channel without being divided. If a reception side receives one ACK frame normally, that frame is recognized as the ACK frame. Therefore, retransmission of data due to a failure to receive the ACK frame occurs less frequently, thereby improving the system throughput. Likewise, a control frame such as an RTS/CTS having a short frame length, a data frame having a short frame length, a management frame, or the like, is transmitted at a same rate through the channels without being divided. If the reception side receives one of the frames transmitted through the channels, that frame is recognized as the transmitted frame. Therefore, retransmission of data occurs less frequently, thereby improving the system throughput. To a system according to the IEEE 802.11a standard, the IEEE 802.11b standard, the IEEE 802.11g standard, or the like, a band reservation time and the like are notified at the same time.

The division and allotment according to this embodiment will now be explained. The protocol control unit 38 determines transmission rates of the channels through which the respective physical layers 31-1, 31-2, and 31-3 carried out communications, and notifies at least one of transmission frame lengths, the transmission rates of the respective channels, a number of channels used, and the like to the TxControl unit 37.

The TxControl unit 37 is required to designate the transmission rate, the data length, and the like for each channel using a TXVECTOR before transmission. The TxControl unit 37 thus performs the following division and allotment to the respective channels in response to the notification from the protocol control unit 38.

A method for calculating a number of octets of a DATA portion and a data length in each channel, which are required for the division and allotment will be explained. For convenience of explanation, the example of three channels (the physical layer 31-1: Channel-A, the physical layer 31-2: Channel-B; and the physical layer 31-3: Channel-C) will be explained.

A number of OFDM symbols N required for transmission of the MPDU is represented by the following Equation (1), where, for example, a size of the MPDU including the MAC header, the LLC header, the SNAP header, the frame body, and the FCS is L [octets], the transmission rates of the respective channels are RATE (a), RATE (b), and RATE (c) [megabits per second], the numbers of octets per OFDM symbol in the respective channels are $N_{DOPS}(a)$, $N_{DOPS}(b)$, and $N_{DOPS}(c)$ [octets], and the number of channels is k.

$$N = \text{floor}\left[\frac{(\text{Frame length} + k) - \begin{pmatrix}\text{Number of octets transmittable}\\ \text{with head OFDM symbol}\end{pmatrix}}{(\text{Number of octets transmittable with OFDM symbol})}\right] + 1 \quad (1)$$

In the Equation (1), floor [·] denotes a rounding up of decimal values, and "Frame length+k" takes into consideration of a Tail bit. Further, RATE (a)≧RATE (b)≧RATE (c), and the number of OFDM symbols does not include a number of symbols of a SIGNAL field transmitted by BPSK (Binary Phase Shift Keying: R=1/2). Furthermore, a head OFDM symbol has two octets less than other symbols because of the SERVICE field, which is two octets.

A general equation of the number of OFDM symbols N can be represented by the following Equation (2).

$$N = \text{floor}\left[\frac{L + k - \left(\sum_{x=1}^{k} N_{DOPS}(x) - 2k\right)}{\sum_{x=1}^{k} N_{DOPS}(x)}\right] + 1 \quad (2)$$

$$= \text{floor}\left[\frac{L + 3k}{\sum_{x=1}^{k} N_{DOPS}(x)}\right]$$

The number of OFDM symbols when there are three channels (CHs) can be, therefore, represented by the following Equation (3).

$$N = \text{floor}\left[\frac{(L+3) - (N_{DOPS}(a) + N_{DOPS}(b) + N_{DOPS}(c) - 6)}{N_{DOPS}(a) + N_{DOPS}(b) + N_{DOPS}(c)}\right] + 1 \quad (3)$$

$$= \text{floor}\left[\frac{L + 9}{N_{DOPS}(a) + N_{DOPS}(b) + N_{DOPS}(c)}\right]$$

Equations for calculating the frame lengths in the respective channels can be derived from the Equation (3) into the following Equations (4) to (6) where the frame lengths in the channels are LENGTH (A), LENGTH (B), and LENGTH (C), respectively. The frame is allotted in descending order of transmission rate (starting from the Channel-A). The Equations (4) represent a case where a final data of the MPDU ends in the Channel-A, the Equations (5) represent a case where the final data of the MPDU ends in the Channel-B, and the Equations (6) represent a case where the final data of the MPDU ends in the Channel-C.

$$\text{LENGTH}(A) = (N-1) \times N_{DOPS}(a) - 3 + \quad (4)$$
$$\text{mod}\left[\frac{L+9}{N_{DOPS}(a) + N_{DOPS}(b) + N_{DOPS}(c)}\right]$$
$$\text{LENGTH}(B) = (N-1) \times N_{DOPS}(b) - 3$$
$$\text{LENGTH}(C) = (N-1) \times N_{DOPS}(c) - 3$$
$$\left(\text{Where, mod}\left[\frac{L+9}{N_{DOPS}(a) + N_{DOPS}(b) + N_{DOPS}(c)}\right] \leq N_{DOPS}(a)\right)$$

$$\text{LENGTH}(A) = N \times N_{DOPS}(a) - 3 \quad (5)$$
$$\text{LENGTH}(B) = (N-1) \times N_{DOPS}(b) - 3 + $$
$$\left(\text{mod}\left[\frac{L+9}{N_{DOPS}(a) + N_{DOPS}(b) + N_{DOPS}(c)}\right] - N_{DOPS}(a)\right)$$
$$\text{LENGTH}(C) = (N-1) \times N_{DOPS}(c) - 3$$
$$\left(\text{Where, } N_{DOPS}(a) < \text{mod}\left[\frac{L+9}{N_{DOPS}(a) + N_{DOPS}(b) + N_{DOPS}(c)}\right] \leq \right.$$
$$\left. N_{DOPS}(a) + N_{DOPS}(b)\right)$$

$$\text{LENGTH}(A) = N \times N_{DOPS}(a) - 3 \quad (6)$$
$$\text{LENGTH}(B) = N \times N_{DOPS}(b) - 3$$
$$\text{LENGTH}(C) = (N-1) \times N_{DOPS}(c) - 3 + $$
$$(\text{mod}\left[\frac{L+9}{N_{DOPS}(a) + N_{DOPS}(b) + N_{DOPS}(c)}\right] - $$
$$N_{DOPS}(a) - N_{DOPS}(b))$$
$$\left(\text{Where, } N_{DOPS}(a) + N_{DOPS}(b) < \right.$$
$$\text{mod}\left[\frac{L+9}{N_{DOPS}(a) + N_{DOPS}(b) + N_{DOPS}(c)}\right] \text{ or,}$$
$$\left. \text{mod}\left[\frac{L+9}{N_{DOPS}(a) + N_{DOPS}(b) + N_{DOPS}(c)}\right] = 0\right)$$

Namely, the protocol control unit 38 calculates the frame lengths transmitted through the respective channels, and the TxControl unit 37 integrally performs the FCS addition, the time stamp addition, the control of readout from the buffer, the back-off processing, and the like according to the frame division and the allotment.

Each of the Tx units 34-1, 34-2, and 34-3 performs the issuance of the primitive, the data writing process, and the like to the corresponding physical layer to exchange data and the control signal with the physical layer. Each of the physical layers 31-1, 31-2, and 31-3 generates a transmission data frame from the data transmitted from the corresponding Tx unit and transmits the generated transmission data frame.

For reception, the Rx units 35-1, 35-2, and 35-3 perform reception of the primitives, reading, and the like from the respective physical layers 31-1, 31-2, and 31-3. The RxControl unit 36 receives results of the reception and the reading. The RxControl unit 36 integrally performs the combining of the frames received through the channels, the FCS check, the writing to the buffer, the address decoding, the channel status processing, and the like. If it is required to transmit the ACK frame, the RxControl unit 36 transmits the ACK frame through the protocol control unit 38 if necessary.

In this embodiment, if the final data of the MPDU ends in the Channel-A, the numbers of OFDM symbols in the Channel-B and the Channel-C are less than that of the Channel-A by one. If the final data of the MPDU ends in the Channel-B, the number of OFDM symbols in the Channel-C is smaller than those of the Channel-A and the Channel-B by one. In these cases, for transfer from the MAC 32 to the physical layers 31, the MAC 32 detects the channel in which the number of OFDM symbols is one less than those in the other channels and adds Pad bits to the detected channel to make the OFDM symbol lengths equal among all the channels. Although three channels are used in this embodiment, an arbitrary number of channels can be used. If only one channel is used, then the division and combining are unnecessary and the operations are similar to those according to the existing IEEE 802.11a, IEEE 802.11b, and IEEE 803.11g standard.

Further, channels which are not adjacent to each other may be used. The division and allotment according to this embodiment is only an example, any equations may be used as long as the transmission timing and the burst times become equal among the channels.

As described above, according to this embodiment, the radio signal conforming to the IEEE 802.11a standard, the IEEE 802.11b standard, the IEEE 802.11g standard, or the like is allotted to the plurality of communication channels to be transmitted to the home/office wireless network. Here, the MAC divides the entire frame as the division target, and allots the frame divisions to the physical layers. It is thereby possible to efficiently utilize the radio band, and thus greatly improve the throughput, as compared with the conventional techniques. Furthermore, since the existing physical layers according to the IEEE 802.11a, IEEE 802.11b, and IEEE 802.11g standards can be used, backward compatibility with respect to the existing systems can be maintained. The operations according to this embodiment are also applicable to MIMO systems spatially having a plurality of channels.

Second Embodiment

In the first embodiment, the method for dividing the entire frame has been explained. In a second embodiment, a method for dividing a part of the frame will be explained. Configurations of a radio communication system, a base station, and a radio terminal according to this embodiment are the same as those shown in FIGS. 1 and 2 according to the first embodiment. Therefore, the same reference numerals are designated to omit descriptions thereof.

Operations of the radio communication system according to the second embodiment will be explained. Only processes different from those according to the first embodiment will be explained.

Figure 6:
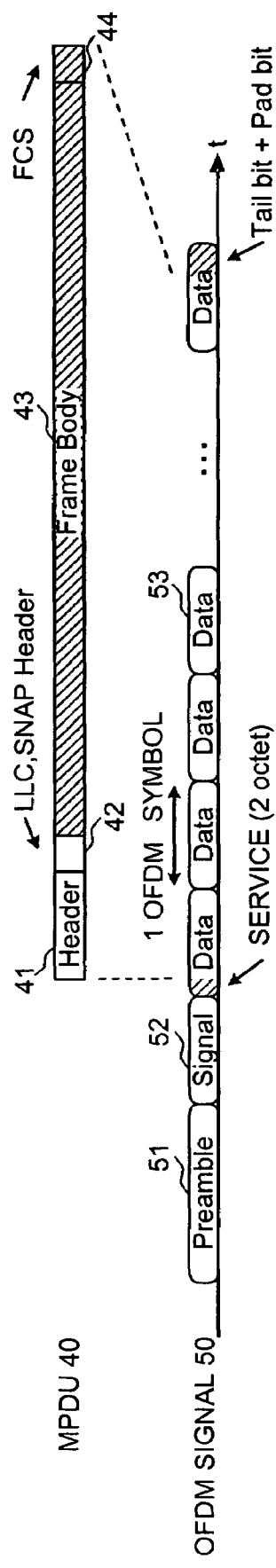
FIG. 6 is an illustration of a data frame format according to the IEEE 802.11a standard.
Figure 7:
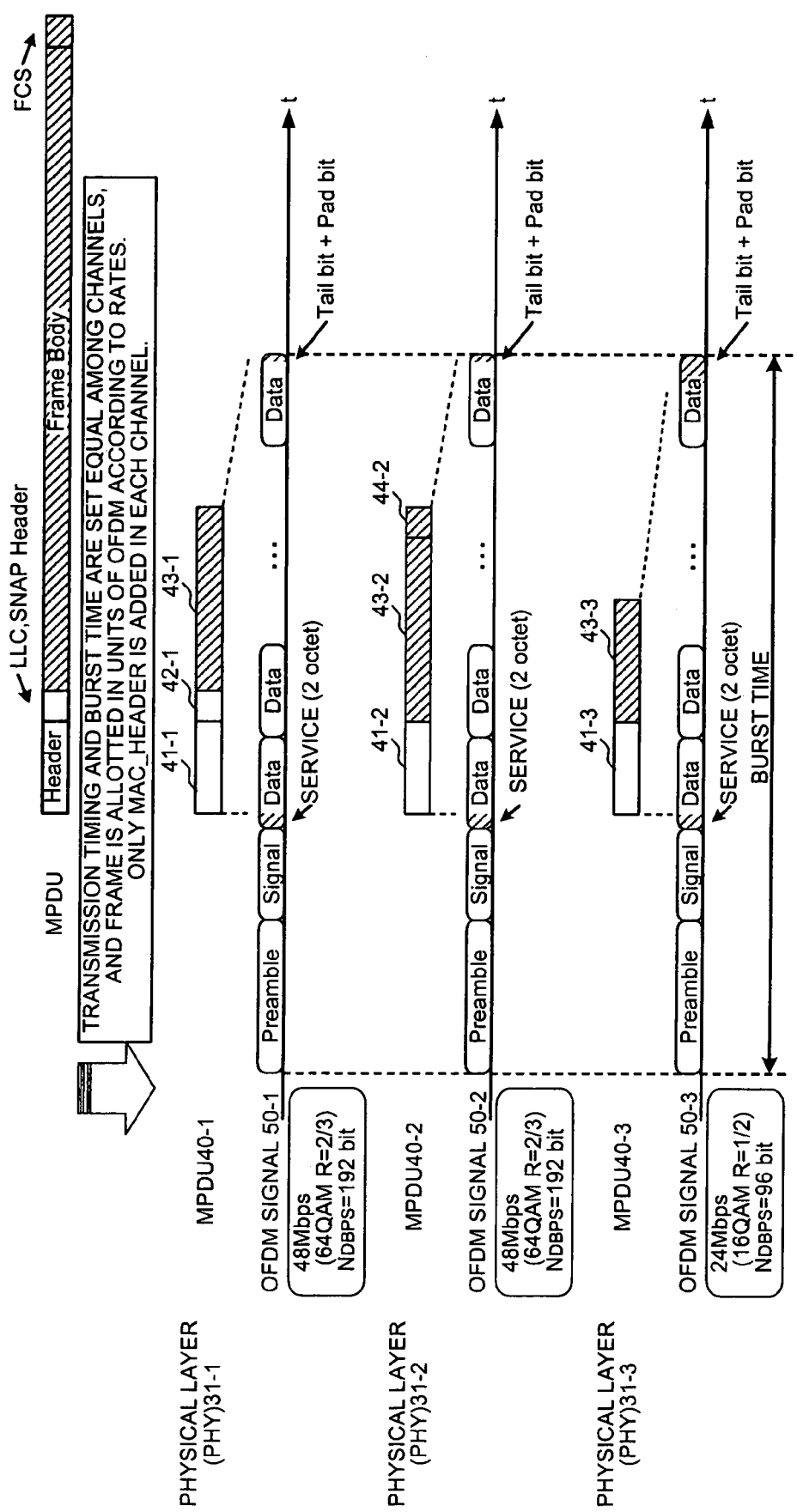
FIG. 7 is an illustration of a frame format when a plurality of channels are used.

FIG. 6 is an illustration of a data frame format according to the IEEE 802.11a standard. FIG. 7 is an illustration of a frame format when a plurality of channels (three channels) are used. It is shown that when a data frame is allotted to the plurality of channels to be transmitted, burst times are equal among the channels.

In this embodiment, the data frame MPDU 40 to be transmitted includes a MAC header 41, an LLC header/SNAP header 42, a frame body 43, and an FCS 44, which are specified by an IEEE 802.11 standard. The LLC header/SNAP header 42, the frame body 43, and the FCS 44 are a target of division are divided from the head in units of $N_{DOPS}$ according to transmission rates of respective physical layers 31-1, 31-2, and 31-3 into divisions (corresponding to an LLC header/SNAP header 42-1, frame bodies 43-1, 43-2, and 43-3, and an FCS 44-2 shown in FIG. 7). The divisions are fed to the physical layers in units of data that can be transmitted per OFDM symbol. In FIG. 7, therefore, OFDM signals 50-1, 50-2, and 50-3 in the respective physical layers have burst times which are substantially equal.

Division and allotment according to this embodiment will now be explained. A method for calculating a number of octets of a DATA portion and data length in each channel, which differs from the method according to the first embodiment, will be explained. Similarly to the first embodiment, an example in which three channels (a physical layer 31-1: Channel-A, a physical layer 31-2: Channel-B; and a physical layer 31-3: Channel-C) are used will be explained.

Figure 8:
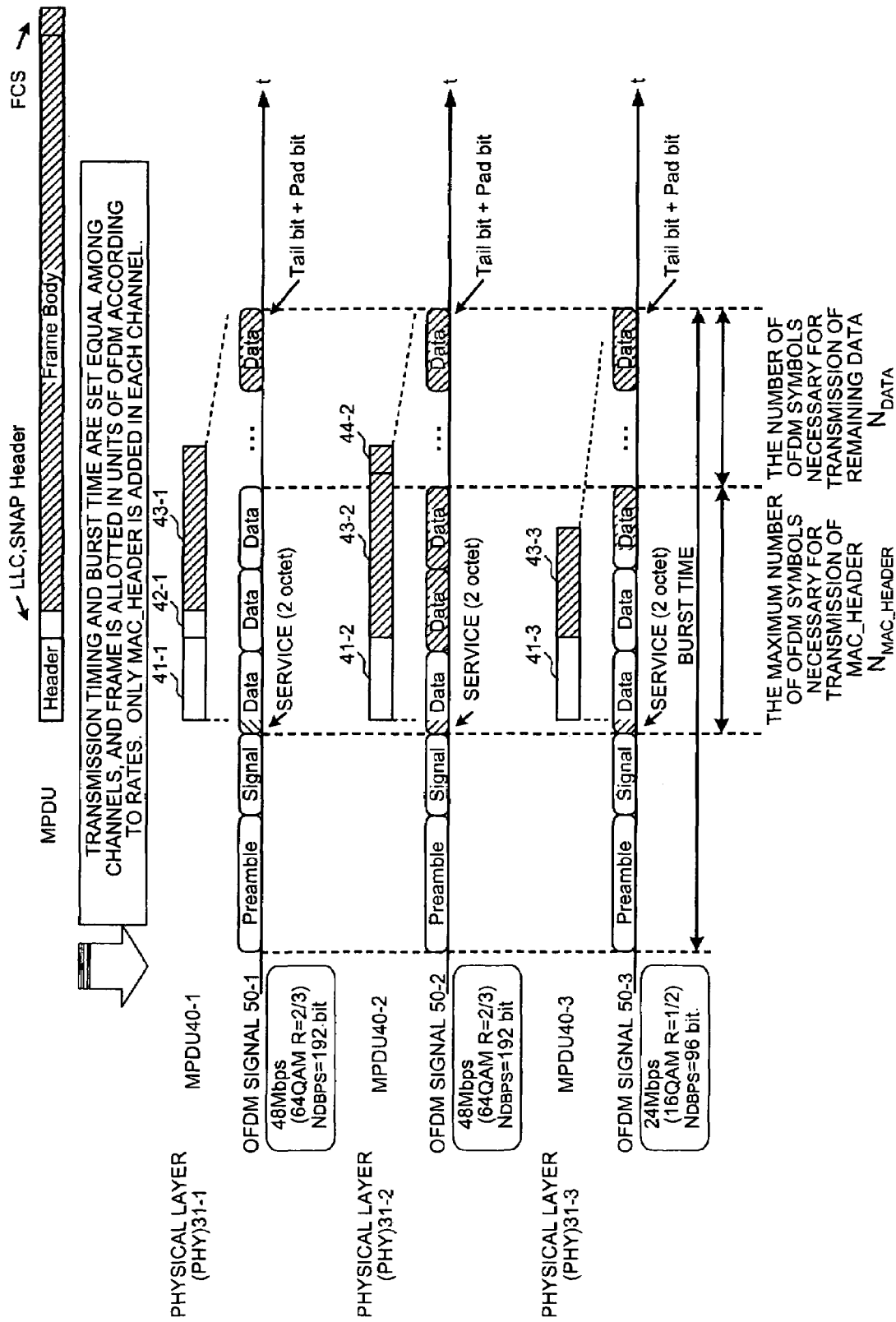
FIG. 8 is an illustration of a method for dividing a part of a frame.

A number of OFDM symbols N required for transmission of the MPDU is calculated as illustrated in FIG. 8, where, for example, a size of the MPDU including the LLC header, the SNAP header, the frame body, and the FCS is L [octets], the transmission rates in the respective channels are RATE (a), RATE (b), and RATE (c) [megabits per second], numbers of octets transmitted per OFDM in the respective channels are $N_{DOPS}(a)$, $N_{DOPS}(b)$, and $N_{DOPS}(c)$ [octets], and the number of channels is k.

Here, RATE (a)≧RATE (b)≧RATE (c), and the number of OFDM symbols do not include a number of symbols for a SIGNAL field transmitted by BPSK (R=1/2). Furthermore, a head OFDM symbol is two octets less than those of the other symbols because of a SERVICE field of two octets.

The number of OFDM symbols required until transmission of the MAC header at the lowest RATE (c) is completed is calculated by the following Equation (7).

$$N_{MAC\_HEADER}(c) = \text{floor}\left[\frac{\text{SERVICE\_FIELD} + \text{MAC\_HEADER}}{N_{DOPS}(c)}\right] \quad (7)$$

An amount of data transmitted in the other channels during that period is then calculated.

$$L_{HEADER} = \sum_{x=1}^{k} (N_{DOPS}(x) \times N_{MAC\_HEADER}(c) - \quad (8)$$

SERVICE_FIELD + MAC_HEADER)

Accordingly, an amount of the remaining data equals L-$L_{HEADER}$. The number of OFDM symbols required to transmit the remaining data is, therefore, represented by the following Equation (9). A general equation for the number of OFDM symbols N required to transmit data is the following Equation (10).

$$N_{DATA} = \text{floor}\left[\frac{(L - L_{HEADER}) + k}{\sum_{x=1}^{k} N_{DOPS}(x)}\right] \quad (9)$$

$$N = N_{MAC\_HEADER}(k) + N_{DATA} \quad (10)$$

$$= \text{floor}\left[\frac{\text{SERVICE\_FIELD} + \text{MAC\_HEADER}}{N_{DOPS}(c)}\right] +$$

$$\text{floor}\left[\frac{(L - L_{HEADER}) + k}{\sum_{x=1}^{k} N_{DOPS}(x)}\right]$$

The number of OFDM symbols N when three channels are used can therefore be represented by the following Equation (11).

$$N = \text{floor}\left[\frac{32}{N_{DOPS}(c)}\right] + \text{floor}\left[\frac{(L - L_{HEADER}) + 3}{N_{DOPS}(a) + N_{DOPS}(b) + N_{DOPS}(c)}\right] \quad (11)$$

Equations for calculating frame lengths in the respective channels can be derived as represented by the following Equations (12) to (14) using the Equation (11), where the frame lengths in the channels are LENGTH (A), LENGTH (B), and LENGTH (C), respectively, and the frames are allocated in descending order of transmission rate (starting from the Channel-A). The Equations (12) represent a case where final data of the MPDU ends in the Channel-A, the Equations (13) represent a case where the final data of the MPDU ends in the Channel-B, and the Equations (14) represent a case where the final data of the MPDU ends in the Channel-C.

$$\text{LENGTH}(A) = (N-1) \times N_{DOPS}(a) - 3 + \\ mod\left[\frac{(L - L_{HEADER}) + 3}{N_{DOPS}(a) + N_{DOPS}(b) + N_{DOPS}(c)}\right] \quad (12)$$

$$\text{LENGTH}(B) = (N-1) \times N_{DOPS}(b) - 3$$
$$\text{LENGTH}(C) = (N-1) \times N_{DOPS}(c) - 3$$
$$\left(\text{Where, } mod\left[\frac{(L - L_{HEADER}) + 3}{N_{DOPS}(a) + N_{DOPS}(b) + N_{DOPS}(c)}\right] \leq N_{DOPS}(a)\right)$$

$$\text{LENGTH}(A) = \times N_{DOPS}(a) - 3 \quad (13)$$
$$\text{LENGTH}(B) = \\ (N-1) \times N_{DOPS}(b) - 3 + mod\left[\frac{(L - L_{HEADER}) + 3}{N_{DOPS}(a) + N_{DOPS}(b) + N_{DOPS}(c)}\right]$$
$$\text{LENGTH}(C) = (N-1) \times N_{DOPS}(c) - 3$$
$$\left(\text{Where, } N_{DOPS}(a) < \\ mod\left[\frac{(L - L_{HEADER}) + 3}{N_{DOPS}(a) + N_{DOPS}(b) + N_{DOPS}(c)}\right] \leq N_{DOPS}(a) + N_{DOPS}(b)\right)$$

$$\text{LENGTH}(A) = N \times N_{DOPS}(a) - 3 \quad (14)$$
$$\text{LENGTH}(B) = N \times N_{DOPS}(b) - 3$$
$$\text{LENGTH}(C) = (N-1) \times N_{DOPS}(c) - 3 + \\ mod\left[\frac{(L - L_{HEADER}) + 3}{N_{DOPS}(a) + N_{DOPS}(b) + N_{DOPS}(c)}\right]$$
$$\left(\text{Where, } N_{DOPS}(a) + N_{DOPS}(b) < \\ mod\left[\frac{(L - L_{HEADER}) + 3}{N_{DOPS}(a) + N_{DOPS}(b) + N_{DOPS}(c)}\right] \text{ or,} \\ mod\left[\frac{(L - L_{HEADER}) + 3}{N_{DOPS}(a) + N_{DOPS}(b) + N_{DOPS}(c)}\right] = 0\right)$$

For reception, the Rx units 35-1, 35-2, and 35-3 perform the reception of primitives, the reading of data, and the like from the physical layers 31-1, 31-2, and 31-3 respectively and feed the results to the RxControl unit 36. The RxControl unit 36 integrally performs the combining of frames received through the plurality of channels, the FCS check, the writing of data to the buffer, the address decoding, the channel status processing, and the like. In this embodiment, the MAC address is included in the head of the frame received through each channel. No processing is, therefore, performed on a frame from an unexpected terminal. If it is necessary to transmit the ACK frame, a returning process through the protocol control unit 38 is performed similarly to the first embodiment.

Figure 9:
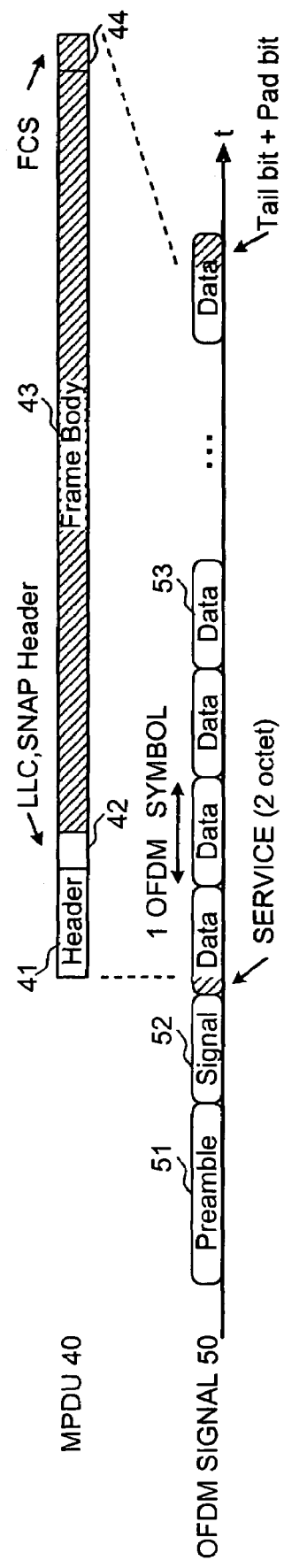
FIG. 9 is an illustration of a data frame format according to the IEEE 802.11a standard.
Figure 10:
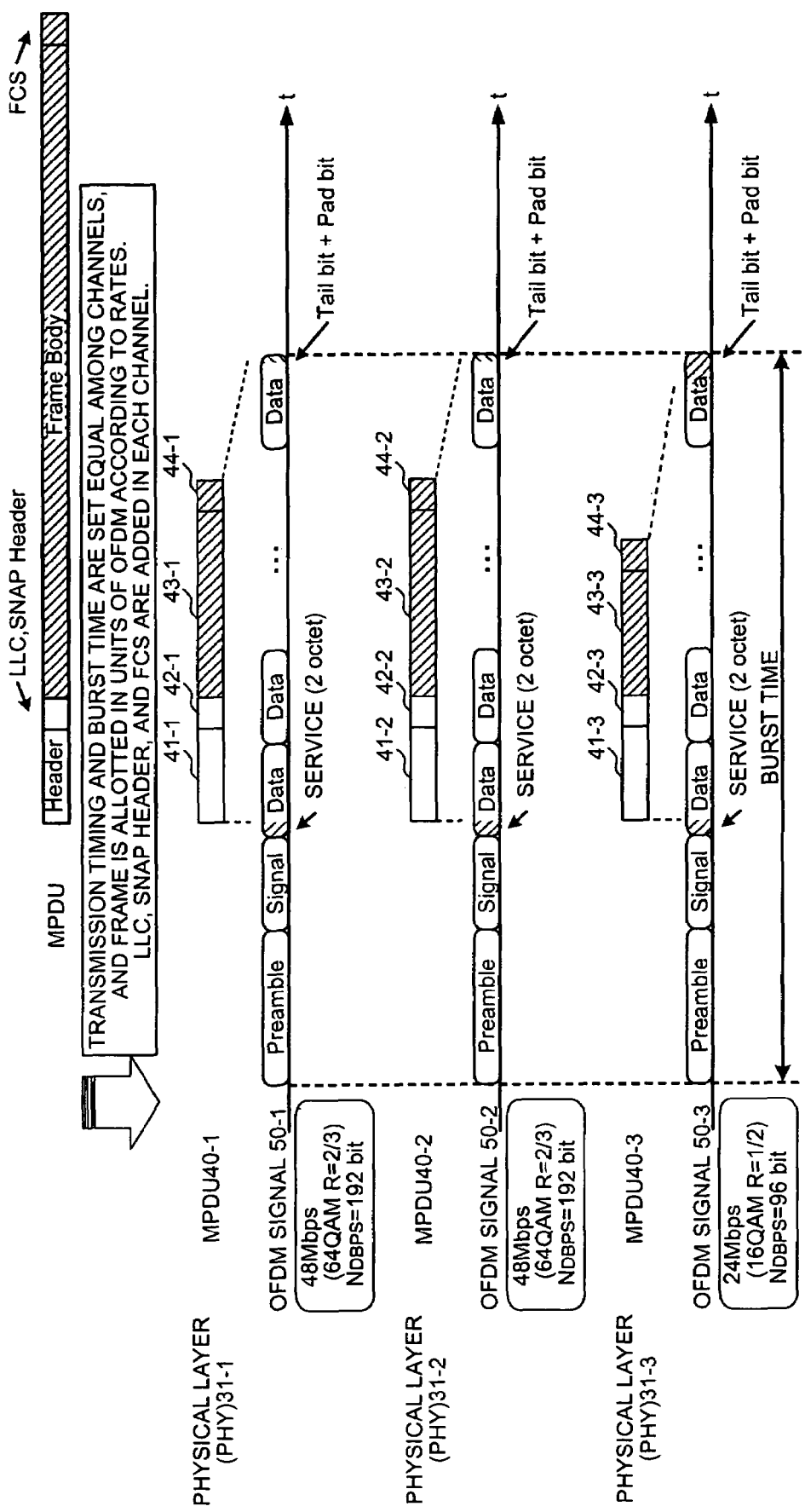
FIG. 10 is an illustration of a method for dividing a part of a frame.

FIG. 9 is an illustration of a data frame format according to the IEEE 802.11a standard. FIG. 10 is an illustration of a method for dividing a part of a frame, differently from that shown in FIG. 8. In FIG. 10, MAC headers 41-1, 41-2, and 41-3, LLC headers/SNAP headers 42-1, 42-2, and 42-3, and FCSs 44-1, 44-2, and 44-3, all of which are specified by an IEEE 802.11 standard, are added to divided frame bodies 43-1, 3-2, and 43-3, respectively.

As described above, according to this embodiment, the radio signal conforming to the IEEE 802.11a standard, the IEEE 802.11b standard, the IEEE 802.11g standard, or the like is allotted to the plurality of communication channels to be transmitted to the home/office wireless network. Here, the MAC sets the part of the frame as the division target, adds the rest of the frame to the divided frame divisions, and allots the added frame divisions to the physical layers. It is thereby possible to efficiently utilize the radio band, and thus greatly improve the throughput, as compared with the conventional techniques. Furthermore, since the existing physical layers conforming to the IEEE 802.11a, IEEE 802.11b, and IEEE 802.11g standards can be used, backward compatibility with respect to the existing systems can be maintained. The operations according to this embodiment are also applicable to a MIMO systems spatially having a plurality of channels.

Third Embodiment

An operation of the radio communication system according to a third embodiment will be specifically explained with reference to the drawings. In this embodiment, only processes different from those according to the first and second embodiments will be explained.

Figure 11:
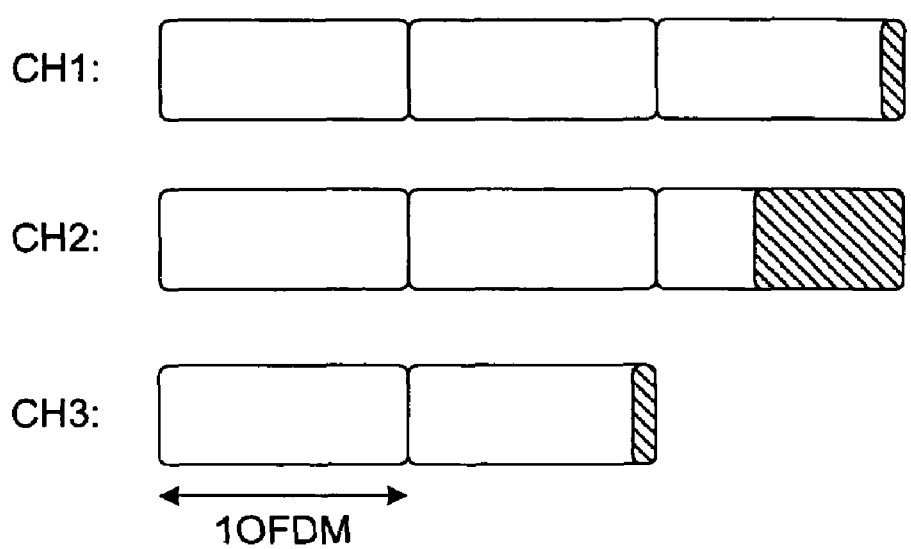
FIG. 11 is an illustration of an example of dividing a frame to a plurality of channels.

FIG. 11 is an illustration of an example of dividing a frame to a plurality of channels. Each rectangle denotes an OFDM symbol, and Pad bits and Tail bits added in the PHYs are shown. In the example of FIG. 11, however, the number of OFDM symbols in a CH1 differs from those in a CH2 and a CH3. As shown in the first and second embodiments, therefore, it is necessary to add the Pad bits to make the numbers of OFDM symbols equal.

Figure 12:
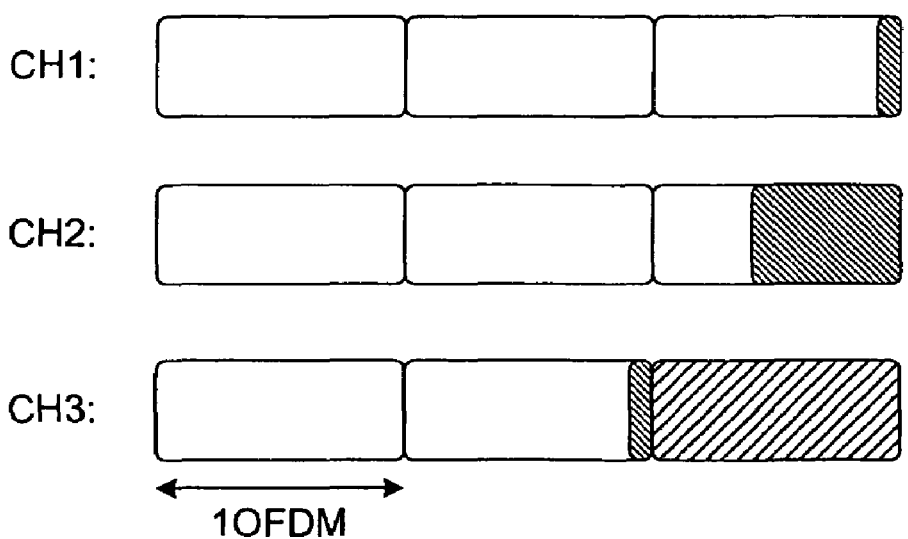
FIG. 12 is an illustration of an example of a third embodiment in which a frame is divided to a plurality of channels.

According to this embodiment, therefore, the numbers of OFDM symbols are made equal as shown in FIG. 12. FIG. 12 is an illustration of one example of this embodiment, in which a frame is divided to a plurality of channels. Each rectangle denotes an OFDM symbol. Pad bits and Tail bits added in the PHYs are shown. Furthermore, in FIG. 12, a MAC Pad indicating that the Pad bits have been added in the PHY by the MAC is added, whereby the numbers of OFDM symbols are equal similarly to the first and second embodiments. It is noted that each frame is allotted in units of OFDM symbol in the order of CH1 to CH3.

Figure 13:
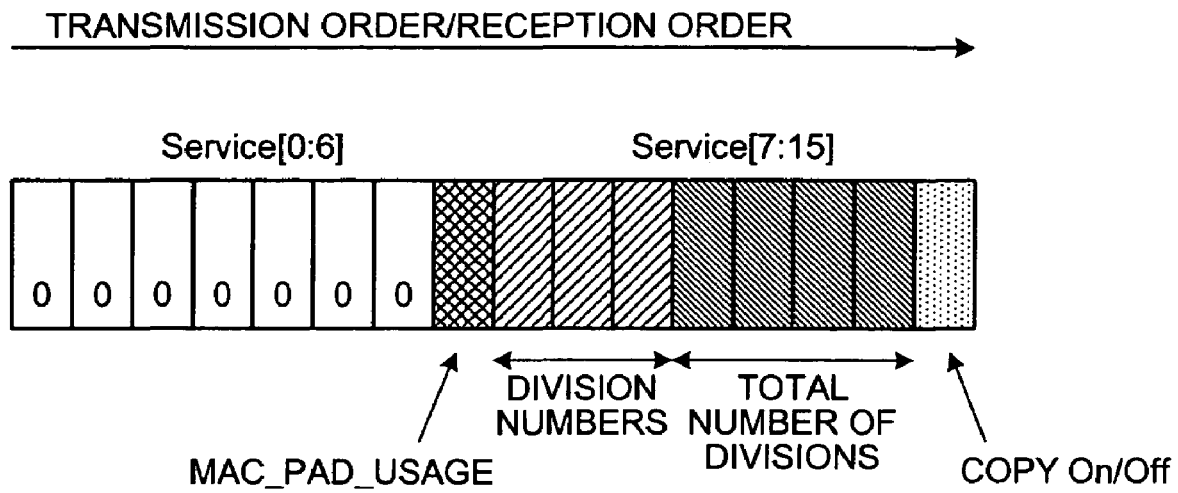
FIG. 13 is an illustration of a service field in a frame according to an IEEE 802.11 standard.

FIG. 13 is an illustration of a service field in the frame conforming to the IEEE 802.11 standard. In this embodiment, a MAC_PAD_USAGE field indicating whether the MACPad is ON or OFF, a division number field, a field for a total number of divisions, and a COPY field indicating whether the same frames are copied in the channels are allocated to Service [7:15] currently secured as Reserved. These fields can be arranged in any order.

Figure 14:
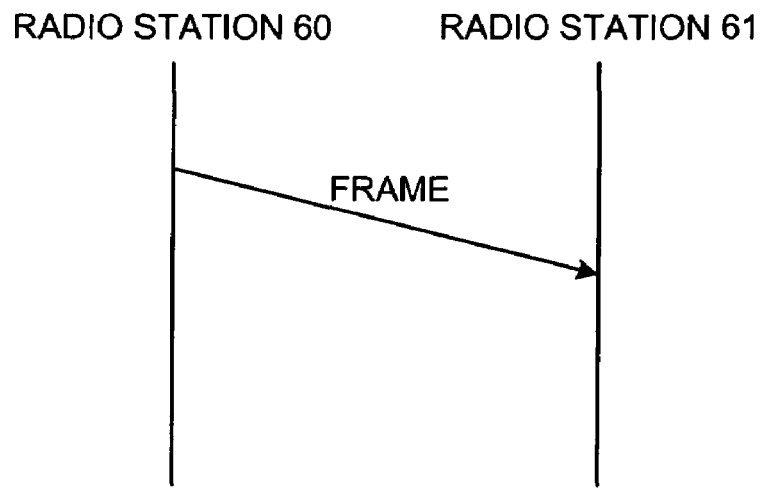
FIG. 14 is an illustration of a communication status between radio stations that carry out communications using a plurality of channels.

FIG. 14 is an illustration of a communications status between radio stations that perform communications using a plurality of channels. At a radio station 60, first, when it is determined that the numbers of OFDM symbols are not equal among the channels as shown in FIG. 11 when the frame is divided, the MAC Pad is added so that the data extend over the next OFDM symbol as shown in, for example, FIG. 12. It is then registered in the MAC_PAD_USAGE field in the Service field of the transmission frame that the MAC Pad has been added. Furthermore, at the radio station 60, necessary information is written in the division number field indicating the order in which the frames are allocated to the channels, and into the field for the total number of divisions indicating how many channels are used in communications, respectively. If the same frame is transmitted to each channel, then ON or OFF information is written into the COPY field, and the generated frames are then transmitted to a radio station 61.

In this embodiment, the MAC_PAD_USAGE field, the division number field, the field for the total number of divisions, and the COPY field are allocated to the Reserved field in the Service field. However, the present invention is not limited thereto, and frames may be expanded in the MAC or PHY per channel.

At the radio station 61 of the reception side, if the frames are received from the radio station 60 of the transmission side, the MAC_PAD_USAGE field, the division number field, the field for the total number of divisions, and the COPY field are checked.

If the frame is copied in the COPY field, the following operation is performed using frames which have been normally received through the channels. If it is indicated by the COPY field that the frame has been divided and transmitted, the frame divisions are combined based on the division number field and the field for the total number of divisions. In the combining process, information on the Pad bits added in the MAC or PHY is detected based on the MAC_PAD_USAGE field notified in each channel, to delete unnecessary Pad bits. If the number of received channels is smaller than a value written in the field for the total number of divisions, this indicates that the frames have not been received successfully, and an error processing is performed, accordingly.

As described above, according to this embodiment, the transmission side adds the MAC_PAD_USAGE field, the division number field, the field for the total number of divisions, and the COPY field. It is thereby possible to accurately detect how the Pad is inserted in each channel. In addition, since the information indicating the order in which the frame is allotted to each channel is inserted, at the reception side, it is possible to know the steps for combining the frames. The operations according to this embodiment are applicable to the base stations and the radio terminals described in the previous embodiments.

INDUSTRIAL APPLICABILITY

As explained above, the base station and the radio terminal according to the present invention are useful for the communication system that transmits and receives the radio signal according to an IEEE 802.11 wireless LAN standard and particularly suited to the communication system for broadening the band using the plurality of communication channels.

The invention claimed is:

1. A base station for a wireless network system realizing band-widening using a plurality of communication channels, the base station comprising:
   a plurality of physical layers corresponding to the plurality of communication channels, and each that transmits and receives a radio signal conforming to a predetermined standard using a corresponding communication channel; and
   a media access control (hereinafter, "MAC") layer, wherein the MAC layer includes,
   a transmitter control that divides an entire data frame conforming to the predetermined standard from a head of the data frame, in accordance with a transmission rate of each physical layer, and allots the divided data frame to the physical layers so that burst times of the communications channels are substantially equal,
   a protocol control that dynamically controls the number of random access slots according to a slot use rate, and
   a receiver control that combines data frames received via a plurality of communication channels through operations opposite to those performed when transmitting.

2. The base station according to claim 1, further comprising:
   a determining unit that determines the transmission rate of each communication channel, a frame allotment ratio between the communication channels, and a transmission data amount in each communication channel, for the MAC layer to carry out the allotment and the combination corresponding to the plurality of communication channels.

3. The base station according to claim 1, further comprising:
   a protocol control unit conforming to the predetermined standard and using a carrier sense multiple access/collision avoidance (CSMA/CA) protocol.

4. The base station according to claim 1, wherein
   for transmission, a frame having a frame length shorter than that of the data frame is not divided and the same frame having a same rate is transmitted to each communication channel, and
   for reception, if one frame having a frame length shorter than that of the data frame is received normally, the received one frame is recognized as a frame transmitted from a transmission side.

5. The base station according to claim 1, wherein
   if a number of communication channels used is one, the division and the combination are not carried out, and the physical layer corresponding to the used communication terminal transmits and receives the radio signal conforming to the predetermined standard.

6. The base station according to claim 1, wherein
   equal frames are allowed to be transmitted simultaneously using the plurality of communication channels.

7. The base station according to claim 1, further comprising:
   a protocol control unit conforming to the predetermined standard and using a polling control.

8. The base station according to claim 1, wherein
   the plurality of communication channels are selectable according to a frequency, a space, or a combination of the frequency and the space.

9. The base station according to claim 1, wherein
   if the plurality of communication channels are used, a division number, a total number of divisions, a Pad insertion method, and information indicating whether a same frame is copied for the plurality of communication channels are included in the data frame.

10. A base station for a wireless network system realizing band-widening using a plurality of communication channels, the base station comprising:
    a plurality of physical layers corresponding to the plurality of communication channels, and each that transmits and receives a radio signal conforming to a predetermined standard using a corresponding communication channel; and
    a media access control (hereinafter, "MAC") layer,
    when transmitting, that divides a part of a data frame conforming to the standard from a head of the part of the data frame, in accordance with a transmission rate of each physical layer, and allots the divided part of the data frame to the physical layers so that burst times of the communications channels are substantially equal, and
    when receiving, that combines data frames received via a plurality of communication channels through operations opposite to those performed when transmitting.

11. The base station according to claim 10, further comprising:
    a determining unit that determines the transmission rate of each communication channel, a frame allotment ratio between the communication channels, and a transmission data amount in each communication channel, for the MAC layer to carry out the allotment and the combination corresponding to the plurality of communication channels.

12. The base station according to claim 10, further comprising:
   a protocol control unit conforming to the predetermined standard and using a carrier sense multiple access/collision avoidance (CSMA/CA) protocol.

13. The base station according to claim 10, wherein
   for transmission, a frame having a frame length shorter than that of the data frame is not divided and the same frame having a same rate is transmitted to each communication channel, and
   for reception, if one frame having a frame length shorter than that of the data frame is received normally, the received one frame is recognized as a frame transmitted from a transmission side.

14. The base station according to claim 10, wherein
   if a number of communication channels used is one, the division and the combination are not carried out, and the physical layer corresponding to the used communication terminal transmits and receives the radio signal conforming to the predetermined standard.

15. The base station according to claim 10, wherein
   equal frames are allowed to be transmitted simultaneously using the plurality of communication channels.

16. The base station according to claim 10, further comprising:
   a protocol control unit conforming to the predetermined standard and using a polling control.

17. The base station according to claim 10, wherein
   the plurality of communication channels are selectable according to a frequency, a space, or a combination of the frequency and the space.

18. The base station according to claim 10, wherein
   if the plurality of communication channels are used, a division number, a total number of divisions, a Pad insertion method, and information indicating whether a same frame is copied for the plurality of communication channels are included in the data frame.

19. A radio terminal for a wireless network system realizing band-widening using a plurality of communication channels, the radio terminal comprising:
   a plurality of physical layers corresponding to the plurality of communication channels, and each that transmits and receives a radio signal conforming to a predetermined standard using a corresponding communication channel; and
   a media access control (hereinafter, "MAC") layer, wherein the MAC layer includes,
   a transmitter control that divides an entire data frame conforming to the standard from a head of the data frame, in accordance with a transmission rate of each physical layer, and allots the divided data frame to the physical layers so that burst times of the communications channels are substantially equal,
   a protocol control that dynamically controls the number of random access slots according to a slot use rate, and
   a receiver control that combines data frames received via a plurality of communication channels through operations opposite to those performed when transmitting.

20. The radio terminal according to claim 19, further comprising:
   a determining unit that determines the transmission rate of each communication channel, a frame allotment ratio between the communication channels, and a transmission data amount in each communication channel, for the MAC layer to carry out the allotment and the combination corresponding to the plurality of communication channels.

21. The radio terminal according to claim 19, further comprising:
   a protocol control unit conforming to the predetermined standard and using a carrier sense multiple access/collision avoidance (CSMA/CA) protocol.

22. The radio terminal according to claim 19, wherein for transmission, a frame having a frame length shorter than that of the data frame is not divided and the same frame having a same rate is transmitted to each communication channel, and
   for reception, if one frame having a frame length shorter than that of the data frame is received normally, the received one frame is recognized as a frame transmitted from a transmission side.

23. The radio terminal according to claim 19, wherein
   if a number of communication channels used is one, the division and the combination are not carried out, and the physical layer corresponding to the used communication terminal transmits and receives the radio signal conforming to the predetermined standard.

24. The radio terminal according to claim 19, wherein
   equal frames are allowed to be transmitted simultaneously using the plurality of communication channels.

25. The radio terminal according to claim 19, further comprising:
   a protocol control unit conforming to the predetermined standard and using a polling control.

26. The radio terminal according to claim 19, wherein
   the plurality of communication channels are selectable according to a frequency, a space, or a combination of the frequency and the space.

27. The radio terminal according to claim 19, wherein
   if the plurality of communication channels are used, a division number, a total number of divisions, a Pad insertion method, and information indicating whether a same frame is copied for the plurality of communication channels are included in the data frame.

28. A radio terminal for a wireless network system realizing band-widening using a plurality of communication channels, the radio terminal comprising:
   a plurality of physical layers corresponding to the plurality of communication channels, and each that transmits and receives a radio signal conforming to a predetermined standard using a corresponding communication channel; and
   a media access control (hereinafter, "MAC") layer,
   when transmitting, that divides a part of a data frame conforming to the predetermined standard from a head of the part of the data frame, in accordance with a transmission rate of each physical layer, and allots the divided part of the data frame to the physical layers so that burst times of the communications channels are substantially equal, and
   when receiving, that combines data frames received via a plurality of communication channels through operations opposite to those performed when transmitting.

29. The radio terminal according to claim 28, further comprising:
   a determining unit that determines the transmission rate of each communication channel, a frame allotment ratio between the communication channels, and a transmission data amount in each communication channel, for the MAC layer to carry out the allotment and the combination corresponding to the plurality of communication channels.

30. The radio terminal according to claim 28, further comprising:

a protocol control unit conforming to the predetermined standard and using a carrier sense multiple access/collision avoidance (CSMA/CA) protocol.

31. The radio terminal according to claim 28, wherein
for transmission, a frame having a frame length shorter than that of the data frame is not divided and the same frame having a same rate is transmitted to each communication channel, and
for reception, if one frame having a frame length shorter than that of the data frame is received normally, the received one frame is recognized as a frame transmitted from a transmission side.

32. The radio terminal according to claim 28, wherein
if a number of communication channels used is one, the division and the combination are not carried out, and the physical layer corresponding to the used communication terminal transmits and receives the radio signal conforming to the predetermined standard.

33. The radio terminal according to claim 28, wherein
equal frames are allowed to be transmitted simultaneously using the plurality of communication channels.

34. The radio terminal according to claim 28, further comprising:
a protocol control unit conforming to the predetermined standard and using a polling control.

35. The radio terminal according to claim 28, wherein
the plurality of communication channels are selectable according to a frequency, a space, or a combination of the frequency and the space.

36. The radio terminal according to claim 28, wherein
if the plurality of communication channels are used, a division number, a total number of divisions, a Pad insertion method, and information indicating whether a same frame is copied for the plurality of communication channels are included in the data frame.

37. A method of transmission used in a transmission device included in a wireless communication system transmitting a data frame by using a plurality of communication channels with different transmission rates, the method comprising:
a frame allotment step of dividing one data frame into frames of differing length corresponding to each of the plurality of the communication channels having said different transmission rates so that transmission burst times are substantially equal for the plurality of communication channels.

38. A method of transmission used in a transmission device included in a wireless communication system transmitting a data frame by using a plurality of antennas, the method comprising:
a transmission rate determination step of determining a transmission rate for each of the plurality of antennas; and
a frame allotment step of dividing one data frame into frames of differing length corresponding to each of the plurality of antennas having different transmission rates so that transmission burst times are substantially equal for the plurality of antennas.

39. A method of transmission used in a transmission device included in a wireless communication system transmitting a data frame by using a plurality of communication channels, the data frame being classified into a first frame or a second frame shorter than the first frame, the method comprising:
a transmission rate determination step of determining a transmission rate for each of the plurality of communication channels; and
a frame allotment step of allotting the date frame divided into the first frame or the second frame to the plurality of communication channels, wherein
if the transmitted data frame is the first frame, the transmission rate determination step includes setting a plurality of transmission rates to the plurality of communication channels, and
the frame allotment step includes dividing one data frame into frames of differing length corresponding to each of the plurality of communication channels having different transmission rates so that transmission burst times are substantially equal for the plurality of communication channels with set transmission rates, and
if the transmitted data frame is the second frame, the transmission rate determination step includes setting a common transmission rate to the plurality of communication channels, and
the frame allotment step includes allotting the data frame each of the plurality of communication channels.

40. A method of transmission used in a transmission device included in a wireless communication system transmitting a data frame and a control frame, the method comprising:
a transmission rate determination step of determining a transmission rate for each of the plurality of communication channels; and
a frame allotment step of allotting the data frame or the control frame to the plurality of communication channels, wherein
if the data frame is transmitted, the transmission rate determination step includes setting plurality of transmission rates to the plurality of communication channels, and
the frame allotment step includes dividing one data frame corresponding to each of the plurality of communication channels so that transmission burst times are substantially equal for the plurality of communication channels with set transmission rates, and
if the control frame is transmitted, the transmission rate determination step includes setting a common transmission rate to the plurality of communication channels, and
the frame allotment step includes allotting the transmitted control frame to each of the plurality of communication channels.

41. The method according to claim 40, wherein
the control frame includes a Clear To Send Signal.

42. A transmission device included in a wireless communication system transmitting a data frame by using a plurality of communication channels with different transmission rates, comprising:
a frame allotment unit that divides one data frame into frames of differing length corresponding to each of the plurality of communication channels having said different transmission rates so that transmission burst times are substantially equal for the plurality of communication channels.

43. A transmission device includes in a wireless communication system transmitting a data frame by using a plurality of antennas, comprising:
a transmission rate determination unit that determines a transmission rate for each of the plurality of antennas; and
a frame allotment unit that divides one data frame into frames of differing length corresponding to each of the plurality of antennas having different transmission rates so that transmission burst times are substantially equal for the plurality of antennas.

44. A transmission device included in wireless communication system transmitting a data frame by using a plurality of communication channels, the data frame being classified into a first frame or a second frame shorter than the first frame, comprising:

a transmission rate determination unit that determines a transmission rate for each of the plurality of communication channels; and a frame allotment unit that allots the data frame divided into the first frame or the second frame to the plurality of communication channels, wherein if the transmitted frame is the first frame, the transmission rate determination unit sets a plurality of transmission rates to the plurality of communication channels, and the frame allotment unit divides the data frame into frames of differing length corresponding to each of the plurality of communication channels having different transmission rates so that transmission burst times are substantially equal for the plurality of communication channels with set transmission rates, and if the transmitted data frame is the second frame, the transmission rate determination unit sets a common transmission rate to the plurality of communication channels, and the frame allotment unit allots the data frame to each of the plurality of communication channels.

45. A transmission device included in a wireless communication system transmitting a data frame and a control frame, comprising:

a transmission rate determination unit that determines a transmission rate for each of the plurality of communication channels; and a frame allotment unit that allots the data frame or the control frame to the plurality of communication channels, wherein if the data frame is transmitted, the transmission rate determination unit sets a plurality of transmission rates to the plurality of communication channels, and the frame allotment unit divides one data frame corresponding to each of the plurality of communication channels so that transmission burst times are substantially equal for the plurality of communication channels with set transmission rates, and if the control frame is transmitted, the transmission rate determination unit sets a common transmission rate to the plurality of communication channels, and the frame allotment unit allots the transmitted control frame to each of the plurality of communication channels.

46. The method according to claim 45, wherein the control frame includes a Clear To Send Signal.

* * * * *